Sept. 24, 1957 G. J. PENNO 2,807,317
GAS FUELED SOLDERING IRONS
Filed March 8, 1954
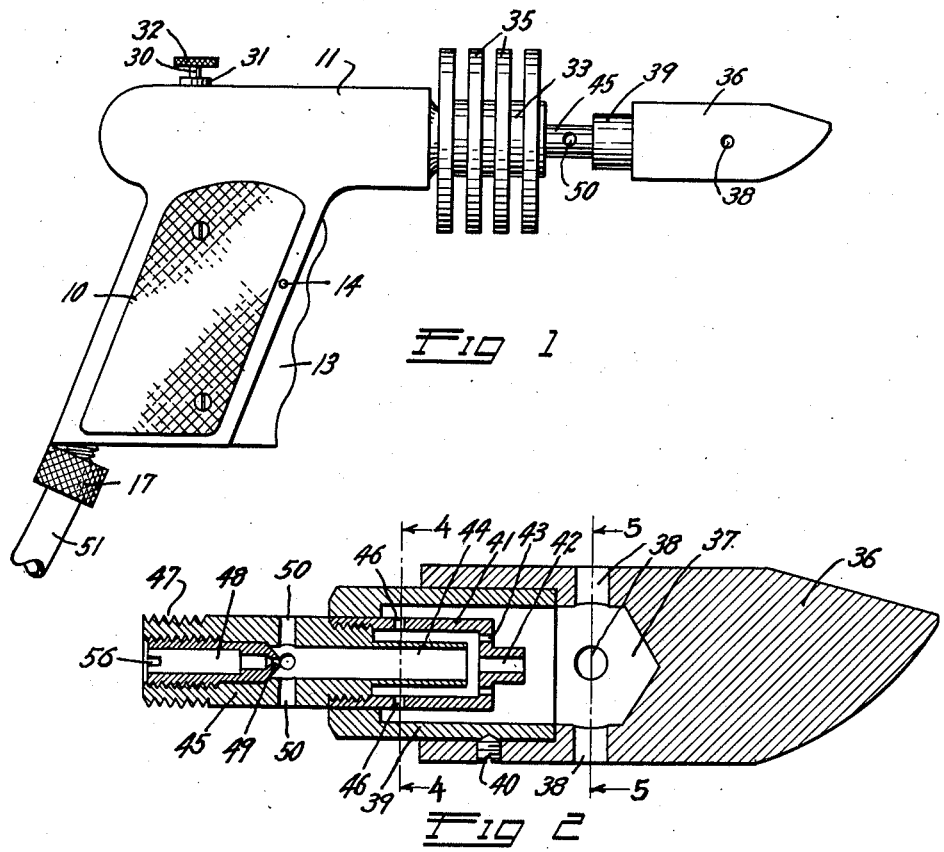
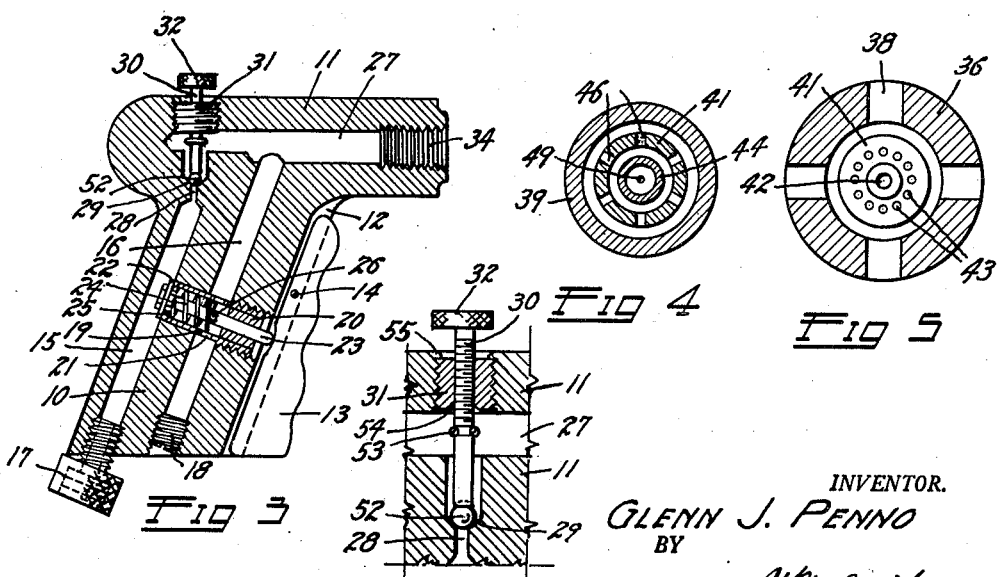
INVENTOR.
GLENN J. PENNO
BY
ATTORNEY

United States Patent Office 2,807,317
Patented Sept. 24, 1957

---

2,807,317

GAS FUELED SOLDERING IRONS

Glenn J. Penno, Denver, Colo.

Application March 8, 1954, Serial No. 414,667

2 Claims. (Cl. 158—26)

This invention relates to a portable gas torch, and more particularly to a soldering iron attachment for a gas torch. The principal object of the invention is to provide a highly efficient, portable, gas-heated soldering tool which can be quickly and easily attached to or detached from a gas torch gun, so that the heat can be accurately controlled by simple trigger operation, and which will embody a permanently lighted pilot light to ignite the flame thereof whenever desired.

Another object of the invention is to so construct the combustion portion of an automatic gas-heated soldering tool that it will be very economical in the use of gas and highly efficient in the production of heat and Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side view of the complete improved gas-operated soldering tool ready for use;

Fig. 2 is an enlarged vertical, longitudinal section through the soldering extremity thereof;

Fig. 3 is a vertical, longitudinal section through the handle extremity thereof;

Figs. 4 and 5 are cross-sections, taken on the lines 4—4 and 5—5, respectively, Fig. 2; and Fig. 6 is a magnified portion of the section of Fig. 3, illustrating a pilot light gas valve employed on the improved torch.

The improved gas-operated soldering tool employs a handle portion 10 and a barrel portion 11. The forward vertical edge of the handle portion 10 is formed with a trigger groove 12 in which a finger-operated trigger 13 is tiltably mounted upon a trigger pin 14. The handle portion 10 contains a main gas passage 15 and an auxiliary gas passage 16. The main gas passage 15 is provided with any suitable hose coupling 17 to which a gas hose 51 may be attached. The lower extremity of the auxiliary gas passage 16 is closed by means of a threaded plug 18.

A valve cage 19 extends between the two passages 15 and 16. The tubular valve cage 19 is threaded into the front of the handle portion 10 in the bottom of the trigger groove 12 and extends across the auxiliary gas passage 16 terminating in the main gas passage 15. A plurality of gas ports 21 formed in the cage communicate with the passage 16, and the terminal extremity of the cage 19 is normally closed by a valve disc 22. A valve stem 23 extends from the valve disc 22 through a sealing bushing 20 in the cage 19 and terminates against the trigger 13. A compression spring 24 acts between a shoulder 25 around the terminal extremity of the cage and a spring pin 26 in the valve stem 23 so as to constantly urge the valve disc 22 to its seat and to resiliently urge the trigger 13 forwardly.

It can be seen that if pressure is applied to the trigger 13, it will force the valve stem 23 inwardly, opening the valve disc 22 and allowing gas to pass from the main gas passage 15 to the auxiliary gas passage 16 and from thence into a horizontal barrel passage 27 formed in the barrel portion 11.

In addition to the above described valved flow of gas, means are provided for allowing a predetermined, constant flow of gas to pass from the main passage 15 to the barrel passage 27. This is accomplished by providing a pilot light gas passage 28 between the upper extremity of the main passage 15 and the barrel passage 27. The upper portion of the passage 28 is enlarged to form a conical valve seat 29 in the passage 28 to receive a freely floating valve ball 52 which can be forced against the seat 29 by means of a threaded valve stem 30. The valve stem 30 is threaded through a bushing 31 threaded in the top of the barrel portion 11 and terminates at its upper extremity in any suitable turning device 32.

Thus, it can be seen that if the valve stem 30 is threaded away from the ball 52, the latter will be lifted away from its seat by the gas pressure to allow a predetermined amount of gas to constantly flow from the main passage 15 into the barrel passage 27. This constant flow of gas is utilized for maintaining a pilot light, as will be later described.

A heat insulating tube 33 is threaded into a threaded socket 34 formed in the forward extremity of the barrel passage 27. The insulating tube is provided with a plurality of parallel, circular, spaced radiating fins 35 which act to radiate heat from the tube 33 and reduce the transmission of heat to the handle portion 10. The forward extremity of the insulating tube 33 is internally threaded to receive various types of burner heads.

For the purposes of this invention, a soldering iron head, as illustrated in detail in Figs. 2, 4 and 5, is supported in the insulating tube 33. The latter head comprises a soldering copper 36 having an internal combustion cavity 37 from which a plurality of radial flame ports 38 exit. The soldering copper is secured over a combustion cup 39 in any desired manner, such as by means of a set screw 40. The forward extremity of the cup 39 opens to the cavity 37. A tubular burner nozzle 41 is forced through and sealed into the rear extremity of the cup 39. The forward extremity of the burner nozzle 41 terminates in a concentric burner jet 42 surrounded by a concentric series of spaced-apart pilot burner openings 43.

A tubular nipple 45 is threaded into and seals the rear extremity of the burner nozzle 41. A gas tube 44 extends forwardly from the tubular nipple 45 into the burner nozzle 41 and terminates rearwardly of the jet 42. A plurality of secondary air intake ports 46 communicate through the walls of the nozzle 41 about the gas tube 44. The nipple 45 extends rearwardly and is threaded, as indicated at 47, so that it may be screwed into the extremity of the insulating tube 33, or, if the insulating tube is not used, into the threaded socket 34 of the barrel portion 11.

An orifice tube 48 is threaded into the tubular nipple 45 and terminates in a pointed extremity provided with a pre-set gas orifice 49. A plurality of primary air passages 50 surround the pointed forward extremity of the orifice tube 48.

Let us assume that the device is assembled, as shown in Fig. 1, and that gas is being furnished through the gas hose 51. This gas is flowing through the orifice plug 29, the barrel passage 27, the insulating tube 33, into the orifice tube 48 and is discharging through the orifice 49 at relatively slow velocity. The gas expands in the gas tube 44 and is blown forwardly therein by the jet 42, discharging through the pilot light opening 43 where it is ignited. There is sufficient air being picked up through the primary air passages 50 to support combustion at the pilot light openings 43.

Ordinarily there is not sufficient gas flowing to force gas through the burner jet 42. However, should sufficient gas be flowing, a pilot light will also be supported at the extremity of the jet 42. A small amount of air will enter the flame ports 38 and be drawn rearwardly into the secondary air ports 46 to assist in combustion of the pilot lights.

Now let us assume it is desired to heat the soldering copper 36. It is only necessary to depress the trigger 13 to open the valve disc 22 and allow a large volume of gas to enter the auxiliary passage 16 and from thence into the orifice tube 48, creating a high-velocity gas jet immediately inside the primary air passages 50. This will draw air in through these passages, supplying primary air for mixture with the gas. This mixture of gas and primary air will then be directed through the burner jet 42, creating an open flame within the combsution cavity 37 and directly within and against the soldering copper 36. The burnt and burning gases will flow outwardly through the flame ports 38.

It has been found, however, that in addition to the outflow of combustion gases there is an in-flow of heated air through the flame ports 38 into the combustion cavity 37, thence rearwardly in the cup 39 and through the secondary air ports 46 to supply secondary air to the gaseous mixture before it discharges through the burner jet 42, so that a flame of exceedingly high temperature is directed against the soldering copper 36 to rapidly and highly heat the latter. When the desired heat has been reached, it is only necessary to release the trigger 13, returning the device to its former pilot-lighted stage which will assist in maintaining the copper heated until again required for use.

An O-ring 53 is inset in a ring groove in the valve stem 30 below and in spaced relation to the bushing 31. The ring 53 will enter a sealing groove 54 in the bottom of the bushing 31 when the stem 30 is unscrewed to its maximum position. The bushing 31 is threaded into the barrel portion 11 slightly below the upper surface of the latter and the edge of the portion 11 about the bushing is peened over as shown at 55 to prevent the bushing from unscrewing. Thus, the O-ring prevents the ball 52 from being allowed to open beyond a pre-determined maximum. The O-ring also seals about the stem 30 when the valve is fully opened to prevent leakage of gas. It is also impossible to accidentally unscrew either the valve stem 30 or the bushing 31. Therefore, a perfectly safe pilot light control is obtained and both pilot light gas and main burner gas are obtained from a single main gas passage.

The orifice tube 48 is provided with a convenient screw driver slot 56 whereby it may easily be reached and quickly removed and replaced to provide jets for various adaptations. The outside position of the orifice tube 48 facilitates cleaning and servicing.

The soldering copper 36 can also be quickly and easily removed by loosening the set screw to interchange coppers of various sizes and shapes. When the copper is completely removed, a highly efficient burner torch is provided.

Since all heating is done from the inside, oxidization of the working surface and carbon formation is reduced to a minimum, gas pressures ranging from 10 p. s. i. to 90 p. s. i. have been easily accommodated by the improved torch to produce a flame heat of 3200° F.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. In a gas-heated soldering tool, a gas conduit member having a gas orifice extending axially therein, radially disposed primary air openings formed in said conduit member adjacent said orifice, an air and gas mixing tube extending forwardly of said orifice, a tubular burner nozzle surrounding and spaced from said mixing tube; a burner jet projecting forwardly from said nozzle; a soldering copper mounted to receive a burning jet of gas from said burner jet; means for maintaining a pilot light adjacent said burner jet, comprising a plurality of pilot light openings in said burner nozzle about the burner jet to provide relatively small pilot flames about said burner jet; and means for supplying a continuous low volume flow of gas to said pilot light openings in combination with means for supplying an increased volume of gas to both said burner jet and said pilot light openings when desired, said low volume flow being sufficient to maintain pilot light flames at said pilot light openings.

2. A gas heated soldering tool as defined in claim 1, wherein said nozzle is formed with radial secondary air openings, a combustion cup disposed about said nozzle forming an annular chamber thereabout, said soldering copper being formed with a combuston cavity communicating with said combustion chamber and provided with radial flame ports, said flame ports serving also to supply secondary air to said secondary air ports in said nozzle.

References Cited in the file of this patent

UNITED STATES PATENTS

| | | |
|---|---|---|
| 712,938 | Kaufman | Nov. 4, 1902 |
| 1,233,423 | Wallace | July 17, 1917 |
| 1,420,107 | King | June 20, 1922 |
| 1,543,471 | Coberly | June 23, 1925 |
| 1,662,734 | Baker | Mar. 13, 1928 |
| 1,831,799 | Anderson | Nov. 17, 1931 |
| 2,237,889 | Rickert | Apr. 8, 1941 |
| 2,388,327 | Jacobsson et al. | Nov. 6, 1945 |
| 2,684,531 | Smith | July 27, 1954 |

FOREIGN PATENTS

| | | |
|---|---|---|
| 810,147 | Germany | Aug. 5, 1951 |